April 30, 1935. A. C. KLECKNER ET AL 1,999,698
PRESSURE RESPONSIVE VALVE
Original Filed April 11, 1933
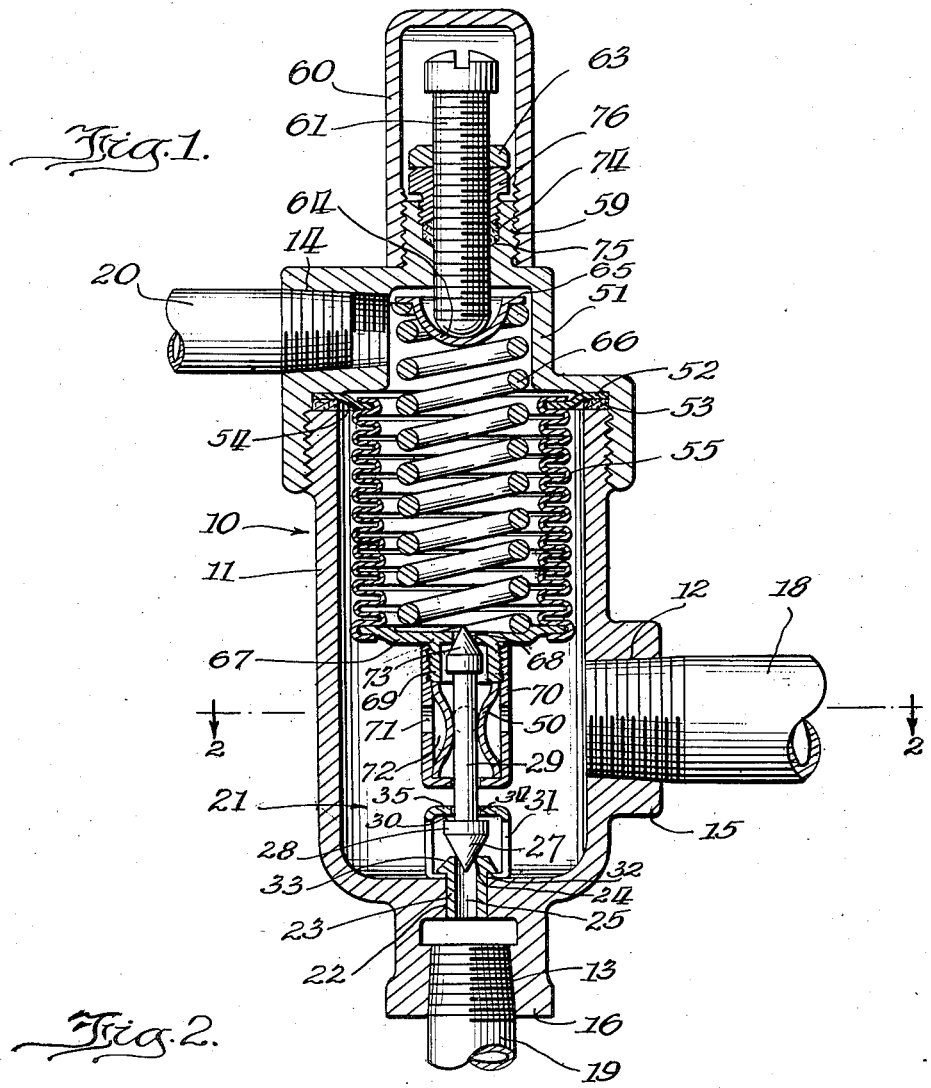
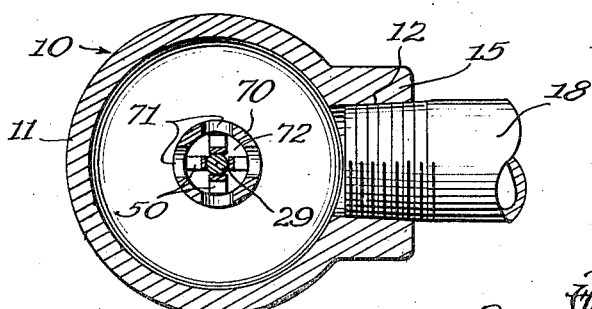

Patented Apr. 30, 1935

1,999,698

UNITED STATES PATENT OFFICE 1,999,698

PRESSURE RESPONSIVE VALVE

Arthur C. Kleckner and Harrison E. Fellows, Racine, Wis., assignors to Webster Electric Company, Racine, Wis., a corporation of Wisconsin Original application April 11, 1933, Serial No. 665,539. Divided and this application April 16, 1934, Serial No. 720,706

9 Claims. (Cl. 137—153)

The present invention relates to pressure responsive valves and has as one of its primary objects to simplify, render more efficient, and improve devices of this character. The invention, while capable of many and diversified uses, finds particular utility when used in connection with oil burners for automatically maintaining a constant pressure on the fuel supplied to the burner and for completely stopping this flow at all times when the pressure is below a predetermined desirable operating pressure.

The present application is a division of our prior application, Serial No. 665,539, filed April 11, 1933, for Pressure responsive valves, and relates specifically to the modified form of valve shown in Figs. 4 and 5 of the parent application. The above-mentioned parent application relates specifically to the type of valves shown in Figs. 1, 2 and 3 of the parent application.

One of the objects of the present invention is the provision of an improved oil burner fuel supply system in which the oil supply is shut off more promptly than the devices of the prior art when the oil burner is shut down.

With the oil burner pressure regulating valves of the prior art, the pressure regulating valve is adapted to shut off the fuel oil under pressure when the oil pump stops and the pressure of the oil diminishes. However, it requires an appreciable length of time for the pressure regulating valves of the prior art to act, and undesirable operating characteristics are caused by the failure of the valve to act soon enough in shutting off the flow of oil to the nozzle.

The sequence of operation of the elements of an exemplary oil pressure regulator valve of the prior art will now be described for the purpose of showing the undesirable characteristics which are eliminated by means of the present invention.

When the motor is shut off, the pump, which generates the pressure in the oil, stops, as it is driven by the motor, and the fan, which supplies the air to the burner, also stops quite promptly. These rotating elements coast to a position of rest, depending upon the damping action of the fan and the stronger damping action of the pump and the momentum which the rotating parts have. Due to the damping action of the pump, the motor, fan and pump would stop quite quickly.

Where the pressure regulating valve is provided with a by-pass for conducting excess liquid fuel back to the tank, this release of the pressure back to the tank would permit the pressure to diminish in the pressure chamber of the regulating valve quite quickly after the pump stops, and the diaphragm or bellows would close the by-pass valve quite soon after the pump stops. However, it usually requires an appreciable time before the pressure drops in the pressure chamber of the regulating valve to such a point that the outlet valve to the nozzle is closed, and during this time when the air supply has been shut down but the oil supply is still continuing, combustion goes on at the burner nozzle with a reduced supply of oxygen.

This delivery of oil after the blower has been stopped causes imperfect combustion, carbonization of the adjacent parts, and a puffing noise in the furnace due to the lack of air. This puffing of the furnace during the shutting off of the burner can sometimes be heard in parts of the building remote from the furnace; it is very annoying to the occupants, and it is an undesirable operating characteristic, which it is the object of this invention to eliminate.

Another object of the invention is the provision of an improved pressure responsive valve which is adapted to close the output valve or needle valve to the nozzle during the initial movement of the pressure responsive bellows beyond a predetermined amount after the pump has been shut down; in other words, it is an object to provide a valve in which the output valve is first opened and then the by-pass valve, and in which on the closing operation the output valve is first closed and then the by-pass valve closed.

Another object of the invention is the provision of an improved regulator valve by means of which the delivery of oil after the blower has stopped is eliminated or minimized so as to eliminate combustion in the furnace at that time when there would be a lack of oxygen to support the combustion properly.

Another object is the provision of a plurality of improved forms of pressure responsive valves of this type which are distinguished by their simplicity of operation and construction and which insure a supply of fuel to the burner after a constant predetermined pressure, but which cut off the supply of fuel to the burner as soon as possible when the burner is to be shut down.

Referring to the single sheet of drawings accompanying this specification,

Fig. 1 is a vertical sectional view taken upon a plane passing through the axis of the substantially cylindrical valve casing, showing the details of construction of one pressure responsive valve constructed according to the present invention;

Fig. 2 is a sectional view taken on the plane of the line 2—2 of Fig. 1, looking in the direction of the arrows.

Referring to Figs. 1 and 2 of the drawing, 10 indicates in its entirety the pressure responsive valve, which preferably comprises a metal casing 11 having the inlet 12, burner outlet 13, and by-pass outlet 14. The casing 11 is preferably substantially cylindrical in shape, but may assume various forms capable of accomplishing the results described herein, and in some cases may be incorporated in a combined valve strainer and pump unit, with strainers of the type shown in the prior application of Harrison E. Fellows, Serial No. 603,734, filed April 7, 1932, and pumps of the type shown in the prior application of Arthur C. Kleckner, Serial No. 604,834, filed April 12, 1932.

The cylinder casing is preferably provided with outwardly projecting bosses 15, 16, 17 having bores 12, 13 and 14 which are provided with pipe threads for receiving the conduit pipes 18, 19 and 20, which lead from a pump to a nozzle and back to a tank respectively.

The inlet conduit 12 preferably leads to the interior of the valve casing 11 communicating with the pressure chamber 21, and the nozzle outlet 13 also preferably communicates directly with the pressure chamber 21.

The bore 13 preferably leads to a smaller bore 22, which has a pressed or threaded fit with a sleeve 23 which is formed with a valve seat 24 and provided with a bore 25 communicating with the bore 13. The valve seat 24 is adapted to cooperate with a substantially conical point 26 on a needle valve 27. The needle valve is provided with a head 28 and with a stem 29 of reduced size, thereby forming an annular shoulder 30 above the head, which is adapted to serve as a stop.

A stirrup 31 may consist of a strip of metal bent to substantially rectangular shape, as shown, and the stirrup is provided with a bore 32 for passing the sleeve 23. Sleeve 23 may have a head 33, and the lower yoke of stirrup 31 may be confined between head 33 and the inside wall of casing 11. At its upper side the stirrup 31 may be also provided with a bore 34, or it may have the opposite ends of the stirrup directed inwardly toward each other above the annular shoulder 30 on the head of the needle valve 27. Thus the stop flanges 35 of stirrup 31 are adapted to limit the upward movement of the needle valve 27 and hold it in the same position to prevent its further opening while the other parts of the mechanism may continue to move upward.

The cap 51 of the housing is preferably provided with the outlet port 14 which may be connected to the outlet pipe 20 in such manner that the outlet communicates with the interior of the bellows 55.

The upper part of the casing 11 is preferably provided with an open end which may be closed by a cover or cap 51. Casing 11 and cap 51 are provided with complementary threads, and the cap 51 is adapted to clamp against the flat upper end of the casing, supporting plate 52, and a fluid-tight gasket 53.

The annular supporting plate 52 preferably is offset at 54 and at its inner circular edge it may support one end of a pressure responsive flexible bellows. The annular supporting member 52 is clamped between the uppermost folds of the bellows 55, and the joint is suitably welded or soldered to provide a fluid-tight joint.

The bellows is also provided with an end plate 67 at the opposite end, of substantially circular shape, and formed with a seat for the spring, which is clamped between the lowermost folds of the bellows and suitably soldered, welded, or otherwise secured to form a fluid-tight joint.

The end plate 67 is provided with a centrally located aperture 68, forming a valve opening and valve seat. End plate 67 may support a threaded sleeve 69, which is adapted to support an internally threaded tubular casing 70. The casing 70 provides a support and guide for the springs 50, which may consist of tempered steel members formed of strips and bent to substantially the shape shown for the purpose of frictionally gripping the stem 29 and interposing a predetermined amount of resistance to relative movement between the housing 70 and the needle valve 27.

Various types of frictional devices or lost motion devices or fluid pressure arrangements for accomplishing this result may be employed, and are substantially equivalent to the springs illustrated. For example, each of the springs 43 may consist of a resilient sheet metal member having its ends engaging the cylindrical wall of the interior of the housing 70 and having its mid point engaging the stem 29 of the needle valve 27 at regularly spaced points about its periphery.

The springs 50 grip the stem 29 and tend to cause it to move with the housing 70, but when the stop flanges 35 engage the head 28 of the needle valve, the movement of the needle valve is stopped and the springs permit the housing to continue its motion upward, thereby opening the aperture 68 by means of the valve 73.

Sleeve 70 is provided with apertures 71, providing communication between the space 72 inside the sleeve and the pressure chamber 21. The stem 29 of needle valve 27 supports a second needle valve 73 of similar construction at its opposite end for cooperation with the port 68. Needle valve 73 is the by-pass valve.

Various types of pressure responsive diaphragms may be used, but the bellows type of diaphragm is preferably employed on account of the greater range of movement provided by this type of diaphragm and the certainty of operation of such a structure.

Operative embodiments of the invention may also be made by employing a pressure responsive piston slidably mounted in the upper end of the casing 11 and having the outer face of the piston open to external pressure, so that the piston may replace the diaphragm. Such pistons are, however, subject to the disadvantage that they are apt to stick and get out of order, due to the leakage of the liquid past the piston and the deposit of particles of dirt between the wall of the piston and that of the cylinder, and it is preferable to employ the bellows type of diaphragm illustrated.

The upper end of the cap or cover 51 is preferably provided with a threaded lug 59 which is adapted to receive a cap 60 for sealing the pressure adjustment screw bolt 61. The lug 59 has an internally threaded bore 62 for receiving the bolt 61 which is secured in place by a lock nut 63. At its inner end the bolt 61 engages a sheet metal member which is formed with a socket 64 for receiving the inner end of the bolt and with an annular seat 65 for supporting the end of a helical coil spring 66.

The coil spring 66 is under a suitable initial pressure and is compressed between the end plate 56 and the plate 64, which is, of course, supported by the casing 11.

The amount of pressure of the spring 66 tending to move the diaphragm or bellows 55 downward may be regulated by means of the screw bolt 61 and the bolt 61 is thus adapted to predetermine the pressure at which the pressure responsive valves will be actuated.

The operation of the present type of pressure responsive valve is as follows: When the oil pump is started and the oil pressure is generated thereby, oil under pressure is conducted to the pressure chamber 21 through the conduit 12, and as soon as the pressure in chamber 21 has reached a predetermined amount the oil under pressure causes the bellows diaphragm 55 to collapse. The oil under pressure reacts against the natural resiliency of the diaphragm or bellows and also against the pressure of the spring 66 and causes the bellows 55 to move upward, carrying with it the housing 70 and needle valve 27.

The needle valve 27 first opens the port 25, but after the shoulder 30 on the needle valve engages the flange 35, the needle valve does not move any farther away from its seat 24. The nozzle is then supplied with oil under pressure, and as the pressure in the chamber 21 still continues to increase, housing 70 is moved upward by the bellows 55, but the needle valve 27 being held, slippage occurs between the stem 29 and the springs 50, thereby causing the needle valve 73 to open the port 68, which has been closed up to this time. The excess of oil under pressure is by-passed through the ports 71 and 68 into the bellows 55 and out through the conduit 20, back to the tank, and the oil pressure at the nozzle is constantly maintained within predetermined pressure limits.

When the pump motor is shut down, the motor, being stopped by disconnection of the electrical current supply, the pump stops, and as soon as the pump stops the excess of liquid fuel under pressure passes out of the pressure chamber 21 of the valve through the by-pass conduit 14. The pressure in the chamber 21 then diminishes and the bellows 55 tends to move downward under the influence of spring 66, which is not resisted to the same extent by the diminished fluid pressure in the chamber 21.

When the piston moves upward, the springs permit a sliding movement between the housing 70 and stem 29, due to the fact that the stop 35 prevents further movement and the positive resistance of the stop 35 overcomes the lesser resistance of the friction between stem 29 and springs 50.

As soon as the housing 70 starts to move downward, the needle valve 27, which is gripped by the springs 50, moves with the housing 70 and tends to close the needle valve conduit 25 first.

When it has moved far enough to effect a closure of the port 25, then it can move no farther and the positive resistance of the valve seat 24 against the needle valve 27 overcomes the frictional resistance of the gripping springs 50, and the stem 29 slides between the springs as the housing continues to move downward. This causes the needle valve 73 to close the by-pass port 68, and when the valve again reaches the position of Fig. 1, the needle valve 27 and the needle valve 73 are both positively held shut by the spring pressure 66.

If desired, the needle valve may be provided with suitable leakage grooves or other leakage means for permitting leakage after initial closure, to reduce the pressure in chamber 21.

It will thus be observed that by means of the friction device 50 or the lost motion connection between the needle valve and the piston valve, the sequence of operation of these two valves is changed, the needle valve being opened first and closed first, and the piston valve being opened last and closed last.

In this embodiment of the invention the interior of the cap 51 is subjected to fluid under pressure and there might be leakage past the screw bolt 61. Therefore, the sleeve 59 is counterbored at 74, provided with a packing 75 and a gland 76 below the lock nut 63 to prevent any such leakage.

It will be noted that the needle valve is resiliently supported by the springs and permitted to become self-aligning with respect to the frustoconical valve seats with which the needle valves engage. This resilient frictional support enables the needle valves to seat more perfectly and thus assures a better closure, as well as effecting a change in the sequence of the operation of the valves over the prior art.

When pressure responsive valves constructed according to the present invention are employed, the valve outlet to the nozzle is closed quite promptly after the pump is shut down and there is no dribbling of the oil out of the nozzle under reduced pressure nor any continued supply of oil after the blower has ceased operating.

The imperfect combustion and resulting carbonization and the puffing noise which result from lack of air in the devices of the prior art are eliminated by the use of this improved pressure responsive valve, and the operating characteristics of the system are greatly improved.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim is new and desire to secure by Letters Patent of the United States, is:

1. In a pressure responsive valve for oil burners, the combination of a casing provided with a pressure chamber and with inlet, burner outlet and by-pass ports, a pressure responsive diaphragm carried by said casing and located to be responsive to the pressure of oil in said chamber, valve means for controlling the outlet port and valve means for controlling the by-pass port, both said valve means being controlled by said pressure responsive diaphragm, and one of said ports being located in a wall of said diaphragm and a lost motion connection between one of said valve means and said diaphragm whereby either valve may be actuated without actuating the other valve throughout a predetermined range, said lost motion means comprising means for sliding frictional engagement between one of said valves and a part carried by said diaphragm, and stop means for preventing further movement of one of said valves and causing sliding at the point of frictional engagement.

2. In a pressure responsive valve for oil burners, the combination of a casing provided with a pressure chamber and with inlet, burner outlet and by-pass ports, a pressure responsive bellows carried by said casing and located to be responsive to the pressure of oil in said chamber, valve means for controlling the outlet port and valve means for controlling the by-pass port, both said valve means being controlled by said pressure responsive bellows, and a lost motion connection between one of said valve means and said bellows whereby either valve may be actuated without actuating the other valve throughout a predetermined range, said valves comprising a pair of needle valves frictionally and slidably mounted with respect to said bellows.

3. In a pressure responsive valve for oil burners, the combination of a casing provided with a pressure chamber and with inlet, burner outlet and by-pass ports, a pressure responsive bellows carried by said casing and located to be responsive to the pressure of oil in said chamber, valve means for controlling the outlet port and valve means for controlling the by-pass port, both said valve means being controlled by said pressure responsive bellows, and a lost motion connection between one of said valve means and said bellows whereby either valve may be actuated without actuating the other valve throughout a predetermined range, said by-pass port being located in the wall of said bellows, and said valve means comprising a pair of needle valves slidably mounted with respect to said bellows, one of said needle valves controlling said by-pass port, and the other of said needle valves controlling said outlet port, said lost motion connection comprising a plurality of springs carried by said bellows and resiliently gripping the stem of said needle valves.

4. In a pressure responsive valve for oil burners, the combination of a casing provided with a pressure chamber and with inlet, burner outlet and by-pass ports, a pressure responsive bellows carried by said casing and located to be responsive to the pressure of oil in said chamber, valve means for controlling the outlet port and valve means for controlling the by-pass port, both said valve means being controlled by said pressure responsive bellows, and a lost motion connection between one of said valve means and said bellows whereby either valve may be actuated without actuating the other valve throughout a predetermined range, said valves comprising a pair of needle valves with a common stem carried by said bellows and slidably mounted with respect to a supporting body, said body having a plurality of resilient members frictionally engaging the common stem of said needle valves.

5. In a pressure responsive valve for oil burners, the combination of a casing provided with a pressure chamber and with inlet, burner outlet and by-pass ports, a pressure responsive bellows carried by said casing and located to be responsive to the pressure of oil in said chamber, valve means for controlling the outlet port and valve means for controlling the by-pass port, both said valve means being controlled by said pressure responsive bellows, and a lost motion connection between one of said valve means and said bellows whereby either valve may be actuated without actuating the other valve throughout a predetermined range, said by-pass port being located in the wall of said bellows, and said bellows comprising a pair of needle valves slidably mounted with respect to said bellows, one of said needle valves controlling said by-pass port, and the other of said needle valves controlling said outlet.

6. In a pressure responsive valve for oil burners, the combination of a casing provided with a pressure chamber and with inlet, burner outlet and by-pass ports, a pressure responsive bellows carried by said casing and located to be responsive to the pressure of oil in said chamber, valve means for controlling the outlet port and valve means for controlling the by-pass port, both said valve means being controlled by said pressure responsive bellows, and a lost motion connection between one of said valve means and said bellows whereby either valve may be actuated without actuating the other valve throughout a predetermined range, said bellows being provided with said by-pass port, and said valve means comprising a pair of needle valves controlled by said bellows.

7. In a pressure responsive valve for oil burners, the combination of a casing provided with a pressure chamber and with inlet, burner outlet, and by-pass ports, a pressure responsive bellows carried by said casing and located to be responsive to the pressure of oil in said chamber, said by-pass port being located in one wall of said bellows, valve means controlling said by-pass port and said outlet port carried by a common stem, releasable means carried by said bellows for releasably engaging said valve means, said releasable means being adapted to permit movement of said valve means with respect to said bellows, and stop means located to engage said valve means whereby said valve means first opens the burner port and then opens the by-pass port and upon closing said valve means first closes the burner port and then closes the by-pass port.

8. In a pressure responsive valve for oil burners, the combination of a casing provided with a pressure chamber and with inlet, burner outlet, and by-pass ports, a pressure responsive bellows carried by said casing and located to be responsive to the pressure of oil in said chamber, said by-pass port being located in one wall of said bellows, valve means controlling said by-pass port and said outlet port carried by a common stem, releasable means carried by said bellows for releasably engaging said valve means, said releasable means being adapted to permit movement of said valve means with respect to said bellows, and stop means located to engage said valve means whereby said valve means first opens the burner port and then opens the by-pass port and upon closing said valve means first closes the burner port and then closes the by-pass port, said releasable means comprising a plurality of springs resiliently gripping the said common stem of said valve means, and said valve means comprising needle valves carried by said stem.

9. In a pressure responsive valve, the combination of a casing provided with inlet, outlet and by-pass ports, valve means for controlling said outlet port, and valve means for controlling said by-pass port, a pressure responsive diaphragm means for actuating said valves, one of said ports being located in a wall of said diaphragm, and lost motion connecting means between one of said valve means and said pressure responsive means whereby the pressure responsive means operates to open the outlet port first at a predetermined pressure and subsequently to open the by-pass port at a predetermined pressure, and upon closing movement to close said outlet port first and subsequently to close said by-pass port upon a predetermined reduction in pressure.

ARTHUR C. KLECKNER.
HARRISON E. FELLOWS.